(12) United States Patent
Sugimoto et al.

(10) Patent No.: US 11,546,588 B2
(45) Date of Patent: Jan. 3, 2023

(54) IMAGE PROCESSING APPARATUS, IMAGE PROCESSING METHOD AND IMAGE PROCESSING PROGRAM

(71) Applicant: NIPPON TELEGRAPH AND TELEPHONE CORPORATION, Tokyo (JP)

(72) Inventors: Shiori Sugimoto, Musashino (JP); Seishi Takamura, Musashino (JP); Atsushi Shimizu, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/273,157

(22) PCT Filed: Aug. 26, 2019

(86) PCT No.: PCT/JP2019/033317
§ 371 (c)(1),
(2) Date: Mar. 3, 2021

(87) PCT Pub. No.: WO2020/050089
PCT Pub. Date: Mar. 12, 2020

(65) Prior Publication Data
US 2021/0329232 A1 Oct. 21, 2021

(30) Foreign Application Priority Data

Sep. 5, 2018 (JP) .............................. JP2018-166303

(51) Int. Cl.
*H04N 19/00* (2014.01)
*H04N 19/117* (2014.01)
(Continued)

(52) U.S. Cl.
CPC ......... *H04N 19/117* (2014.11); *H04N 19/149* (2014.11); *H04N 19/86* (2014.11)

(58) Field of Classification Search
CPC .... H04N 19/117; H04N 19/149; H04N 19/86; H04N 19/136; H04N 19/154; H04N 19/85
See application file for complete search history.

(56) References Cited

U.S. PATENT DOCUMENTS 10,600,167 B2 *  3/2020  Schied ................ G06V 10/955
10,699,160 B2 *  6/2020  Lee .......................... G06N 3/04
(Continued)

FOREIGN PATENT DOCUMENTS

JP           2018516412 A       6/2018

OTHER PUBLICATIONS

Iván Kopilović and Tamás Szirányi, Artifact reduction with diffusion preprocessing for image compression, Optical Engineering, vol. 44, No. 2, 2005, pp. 1-14.
(Continued)

*Primary Examiner* — Frank F Huang
(74) *Attorney, Agent, or Firm* — Harness, Dickey & Pierce, P.L.C.

(57) ABSTRACT

An image processing device that updates a pixel value of a processing target image and generates a new image generates a first feature vector based on the processing target image and a first feature map generated with at least one pre-decided filter; updates the processing target image to generate an updated image; generates a second feature vector based on the updated image and a second feature map generated with at least one pre-decided filter; performs quality evaluation of the updated image based on the first and second feature vectors and generates a quality feedback vector which is a vector based on a result of the quality
(Continued)

evaluation; performs an encoding amount evaluation on the updated image and generates an encoding amount feedback vector which is a vector based on a result of the encoding amount evaluation; and determines an updating amount in updating of the updated image based on the quality feedback vector and the encoding amount feedback vector.

9 Claims, 3 Drawing Sheets

(51) Int. Cl.
  *H04N 19/149* (2014.01)
  *H04N 19/86* (2014.01)

(56) References Cited

U.S. PATENT DOCUMENTS

| | | | | |
|---|---|---|---|---|
| 10,798,387 | B2* | 10/2020 | Li | H04N 19/593 |
| 10,916,003 | B2* | 2/2021 | Doutre | G06K 9/627 |
| 11,037,348 | B2* | 6/2021 | Shi | G06K 9/6256 |
| 11,055,819 | B1* | 7/2021 | Singh | G06N 3/0454 |
| 11,216,698 | B2* | 1/2022 | Colligan | G06T 5/20 |
| 11,231,762 | B2* | 1/2022 | Belagal Math | G09G 5/026 |
| 2016/0358321 | A1* | 12/2016 | Xu | G06V 10/82 |
| 2018/0131953 | A1 | 5/2018 | Wang et al. | |

OTHER PUBLICATIONS

Eloise Vidal et al., New Adaptive Filters as Perceptual Preprocessing for Rate-Quality Performance Optimization of Video Coding, literature, vol. 52, 2017, pp. 124-137.

Leon A. Gatys et al., Image Style Transfer Using Convolutional Neural Networks, IEEE Conference on Computer Vision and Pattern Recognition (CVPR), Jun. 2016, pp. 2414-2423.

Xuan Jing and Lap-Pui Chau, A Novel Intra-Rate Estimation Method for H.264 Rate Control, IEEE International Symposium on Circuits and Systems, May 2006, pp. 5019-5022.

* cited by examiner

IMAGE PROCESSING APPARATUS, IMAGE PROCESSING METHOD AND IMAGE PROCESSING PROGRAM

CROSS-REFERENCE TO RELATED APPLICATIONS

This application is a 371 U.S. National Phase of International Application No. PCT/JP2019/033317 filed on Aug. 26, 2019, which claims priority to Japanese Application No. 2018-166303 filed on Sep. 5, 2018. The entire disclosures of the above applications are incorporated herein by reference.

TECHNICAL FIELD

The present invention relates to an image processing device, an image processing method, and an image processing program.

BACKGROUND ART

In general, to encode a moving image, it is necessary to control an encoding amount at a target bit rate according to restrictions on a bandwidth of a storage or a transmission network. A general encoding device includes an encoding amount control mechanism and performs encoding amount control in view of balance between an occurrence encoding amount and quality after encoding or decoding.

In H.264/AVC and H.265/HEVC which are general moving image encoding standard specifications, an occurrence encoding amount is controlled by adjusting a quantization parameter (QP) when a coefficient of a discrete cosine transform (DCT) or a discrete sine transform (DST) is quantized. On the other hand, deficiency of a high frequency component caused with an increase in the QP and block distortion occurring in a block boundary have an influence on image quality.

A general encoding device performs tradeoff evaluation between quality evaluation and encoding amount evaluation in order to adjust quality and an encoding amount. However, because it is necessary to perform the encoding again when parameters are adjusted, a calculation cost increases. Therefore, a method of adjusting quality and an encoding amount more simply is required.

Thus, for example, methods of performing pre-processing on a moving image which is an encoding target have been proposed.

For example, NPL 1 discloses a technique for applying a lowpass filter to an image as pre-processing to remove a high frequency component of which a large encoding amount is generally necessary in advance and by dispersing an encoding amount originally assigned to the high frequency component on an entire screen to achieve suppression of block distortion. For example, NPL 2 discloses a technique for applying an adaptive filter to an image and removing a noise component to achieve a reduction in an encoding amount.

CITATION LIST

Non Patent Literature

[NPL 1] I. Kopilovic and T. Sziranyi, "Artifact reduction with diffusion preprocessing for image compression", Optical Engineering, vol. 44, no. 2, pp. 1-14, February 2005.

[NPL 2] E. Vidal, N. Sturmel, C. Guillemot, P. Corlay and F. X. Coudoux, "New Adaptive Filters as Perceptual Preprocessing for Rate-Quality Performance Optimization of Video Coding", Signal Processing: Image Communication, vol. 52, pp. 124-137, 2017.

[NPL 3] L. A. Gatys, A. S. Ecker, and M. Bethge, "Image Style Transfer Using Convolutional Neural Networks", IEEE Conference on Computer Vision and Pattern Recognition (CVPR), pp. 2414-2423, June 2016.

[NPL 4] X. Jing and L. P. Chau, "A Novel Intra-Rate Estimation Method for H.264 Rate Control", IEEE International Symposium on Circuits and Systems, pp. 5019-5022, May 2006.

SUMMARY OF THE INVENTION

Technical Problem

As described above, by removing a high frequency component of an encoding target image in advance, it is possible to achieve a reduction in an encoding amount. However, the details of an overall image are lost in filtering processing and information regarding a context is lost depending on a target image. Thus, the quality of the image deteriorates. On the other hand, an influence on the quality can be suppressed by assuming a deterioration model for noise or the like. However, an application target image is limited and there is no effect on an image unsuitable for the model. It is also difficult to control an encoding amount to be actually reduced.

The present invention has been finalized in view of the foregoing circumstances and an objective of the present invention is to provide a technique capable of adjusting quality and an encoding amount while reducing a calculation cost.

Means for Solving the Problem

According to an aspect of the present invention, an image processing device updates a pixel value of a processing target image and generates a new image. The image processing device includes: a first feature vector generation unit configured to generate a first feature vector based on the processing target image and a first feature map generated with at least one pre-decided filter; an image updating unit configured to update the processing target image to generate an updated image; a second feature vector generation unit configured to generate a second feature vector based on the updated image and a second feature map generated with at least one pre-decided filter; a quality evaluation unit configured to perform quality evaluation of the updated image based on the first and second feature vectors and generate a quality feedback vector which is a vector based on a result of the quality evaluation; an encoding amount evaluation unit configured to perform an encoding amount evaluation on the updated image and generate an encoding amount feedback vector which is a vector based on a result of the encoding amount evaluation; and an updating amount determination unit configured to determine an updating amount in updating of the updated image based on the quality feedback vector and the encoding amount feedback vector.

In the image processing device according to the aspect of the present invention, at least one of the first and second feature maps may be generated through hierarchical convolution processing by the plurality of filters.

In the image processing device according to the aspect of the present invention, at least one of the first and second feature vectors may be generated based on a statistical amount of the first or second feature map.

In the image processing device according to the aspect of the present invention, at least one of the first and second feature vectors may be generated based on a cross-correlation between the first feature maps or a cross-correlation between the second feature maps.

According to another aspect of the present invention, an image processing method is performed by an image processing device that updates a pixel value of a processing target image and generates a new image. The image processing method includes: generating a first feature vector based on the processing target image and a first feature map generated with at least one pre-decided filter; updating the processing target image to generate an updated image; generating a second feature vector based on the updated image and a second feature map generated with at least one pre-decided filter; performing quality evaluation of the updated image based on the first and second feature vectors and generating a quality feedback vector which is a vector based on a result of the quality evaluation; performing an encoding amount evaluation on the updated image and generating an encoding amount feedback vector which is a vector based on a result of the encoding amount evaluation; and determining an updating amount in updating of the updated image based on the quality feedback vector and the encoding amount feedback vector.

According to still another aspect of the present invention, an image processing program causes a computer to function as the foregoing image processing device.

Effects of the Invention

According to the present invention, it is possible to adjust quality and an encoding amount while reducing a calculation cost.

DESCRIPTION OF EMBODIMENT

Embodiment

Hereinafter, an image processing device according to an embodiment of the present invention will be described.

[Functional Configuration of Image Processing Device]

Hereinafter, a functional configuration of an image processing device will be described with reference to the drawings.

Figure 1:
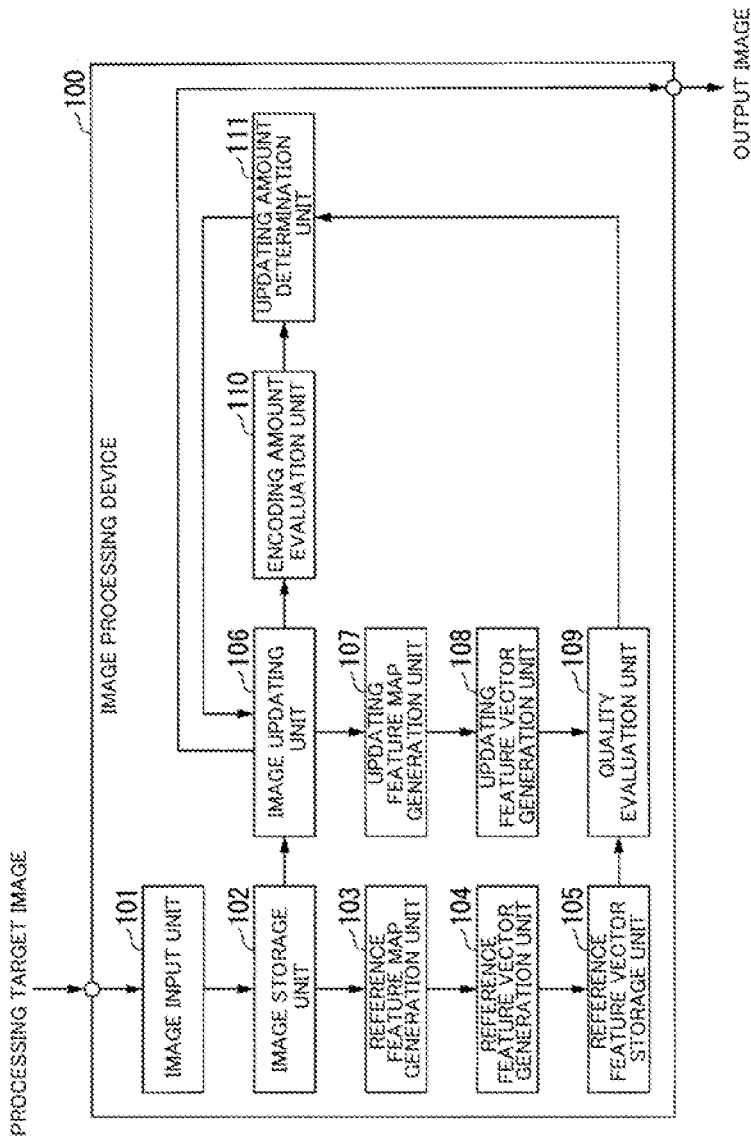
FIG. 1 is a block diagram illustrating a functional configuration of an image processing device 100 according to an embodiment of the present invention.

FIG. 1 is a block diagram illustrating a functional configuration of an image processing device 100 according to an embodiment of the present invention.

As illustrated in FIG. 1, the image processing device 100 includes an image input unit 101, an image storage unit 102, a reference feature map generation unit 103, a reference feature vector generation unit 104 (a first feature vector generation unit), a reference feature vector storage unit 105, an image updating unit 106, an updating feature map generation unit 107, an updating feature vector generation unit 108 (a second feature vector generation unit), a quality evaluation unit 109, an encoding amount evaluation unit 110, and an updating amount determination unit 111.

The image input unit 101 receives an input of an image which is an encoding processing target (hereinafter referred to as a "processing target image"). The image input unit 101 outputs the input processing target image to the image storage unit 102.

The image storage unit 102 stores the processing target image input from the image input unit 101. The image storage unit 102 is, for example, a volatile recording medium such as a random access memory (RAM).

The reference feature map generation unit 103 acquires the processing target image from the image storage unit 102. The reference feature map generation unit 103 generates a feature map based on the processing target image and at least one filter (not illustrated). The feature map generated by the reference feature map generation unit 103 is referred to as a "reference feature map" below. The reference feature map generation unit 103 outputs the generated reference feature map (a first feature map) to the reference feature vector generation unit 104.

The feature map indicates an image on which filtering processing is performed by the filter. Accordingly, the reference feature map is an image obtained by causing the filter to perform the filtering processing on the processing target image.

The filter used here may be any filter. For example, any linear or nonlinear filter such as an edge extraction filter, a smoothing filter, a sharpening filter, or a statistics filter can be used.

Figure 2:
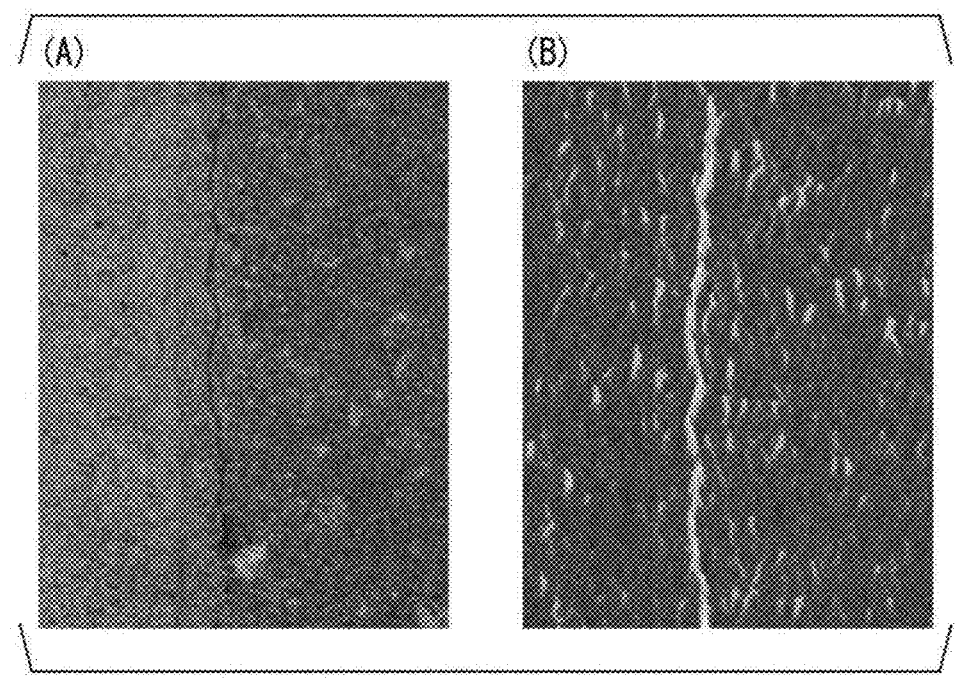
FIG. 2 is a set of diagrams illustrating examples of a processing target image and a feature map to be generated.

For example, examples of an estimation target image and a feature map to be generated when an edge extraction filter is used are illustrated in FIG. 2. FIG. 2(A) illustrates an estimation target image in which a portion in which cracks occurring in a concrete structure are imaged. On the other hand, FIG. 2(B) illustrates a feature map generated by causing the edge extraction filter to perform filtering processing on the estimation target image in FIG. 2(A). In this way, when the edge extraction filter is used, the feature map is an image indicating a portion (edge) in which brightness (light and shade) or color abruptly changes in the estimation target image.

The reference feature vector generation unit 104 generates a feature vector based on the reference feature map input from the reference feature map generation unit 103. The feature vector generated by the reference feature vector generation unit 104 is referred to as a "reference feature vector" below. The reference feature vector generation unit 104 outputs the generated reference feature vector (a first feature vector) in the reference feature vector storage unit 105.

The feature vector mentioned here is a vector value calculated based on data obtained by encoding an image corresponding to a change region of the feature map.

The reference feature vector storage unit 105 stores the reference feature vector input from the reference feature vector generation unit 104. The reference feature vector storage unit 105 is, for example, a volatile recording medium such as a RAM.

The image updating unit 106 acquires the processing target image from the image storage unit 102. The image updating unit 106 generates an updated image by updating the pixel value of the processing target image in accordance with an updating amount input from the updating amount determination unit 111, as will be described. The image updating unit 106 outputs the generated updated image to the updating feature map generation unit 107 and the encoding amount evaluation unit 110.

When a predetermined condition is satisfied, the image updating unit 106 ends the outputting of the updated image to the updating feature map generation unit 107 and the encoding amount evaluation unit 110 and outputs the updated image to an external device. The predetermined condition is, for example, that the updated image is generated a predetermined number of times or a value of the evaluation result of the updated image performed in accordance with any evaluation method reaches a predetermined value or the like.

The updating feature map generation unit 107 generates at least one feature map based on the updated image input from the image updating unit 106 and at least one filter (not illustrated).

The feature map generated by the updating feature map generation unit 107 is referred to as an "updating feature map" below. The updating feature map generation unit 107 outputs the generated updating feature map (a second feature map) to the updating feature vector generation unit 108.

The updating feature vector generation unit 108 generates a feature vector (hereinafter referred to as an "updating feature vector") based on the updating feature map input from the updating feature map generation unit 107.

The updating feature vector generation unit 108 outputs the generated updating feature vector (a second feature vector) to the quality evaluation unit 109.

The quality evaluation unit 109 acquires the reference feature vector from the reference feature vector storage unit 105. The quality evaluation unit 109 evaluates quality of the updated image based on the reference feature vector and the updating feature vector input from the updating feature vector generation unit 108 and generates a quality feedback vector which is a vector value indicating a result of the quality evaluation. The quality evaluation unit 109 outputs the generated quality feedback vector to the updating amount determination unit 111.

Any method can be used as an evaluation method of evaluating the quality of the updated image. For example, an evaluation method by a loss function to be described below can be used.

The encoding amount evaluation unit 110 evaluates an encoding amount of the updated image input from the image updating unit 106 and generates an encoding amount feedback vector which is a vector value indicating a result of the encoding amount evaluation. The encoding amount evaluation unit 110 outputs the generated encoding amount feedback vector to the updating amount determination unit 111.

Any method can be used as an evaluation method of evaluating the encoding amount of the updated image.

For example, the evaluation method by a loss function to be described below can be used.

The updating amount determination unit 111 determines an updating amount based on the quality feedback vector input from the quality evaluation unit 109 and the encoding amount feedback vector input from the encoding amount evaluation unit 110. The updating amount determination unit 111 outputs information indicating the determined updating amount to the image updating unit 106.

[Operation of Image Processing Device]

Hereinafter, an example of an operation of the image processing device will be described with reference to the drawing.

Figure 3:
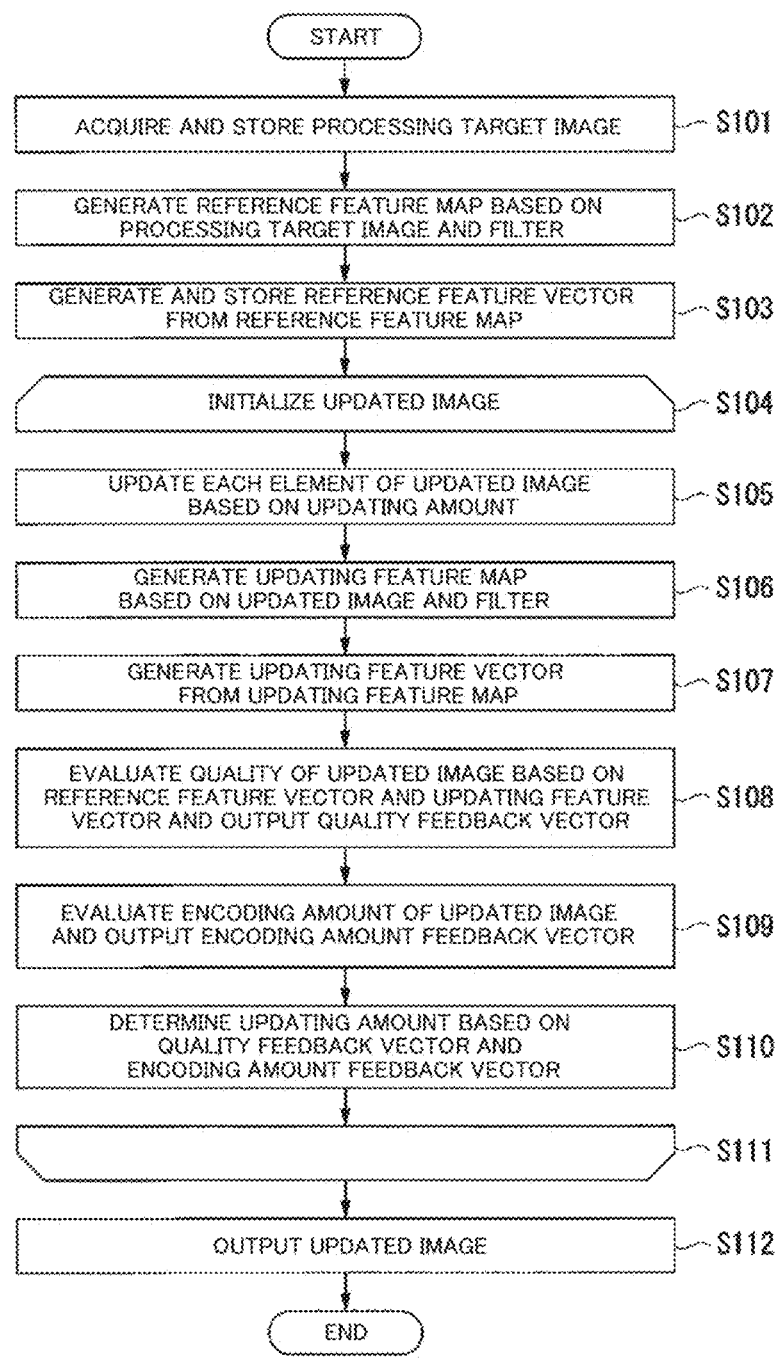
FIG. 3 is a flowchart illustrating an operation of the image processing device 100 according to an embodiment of the present invention.

FIG. 3 is a flowchart illustrating an operation of the image processing device 100 according to an embodiment of the present invention.

First, the image input unit 101 receives an input of the processing target image. The image storage unit 102 stores the input processing target image (step S101).

Subsequently, the reference feature map generation unit 103 generates at least one reference feature map based on the processing target image stored in the image storage unit 102 and at least one filter (step S102).

Any filter can be used as the filter used in step S102, as described above. Any number of filters and any combination of the filters can be used. For example, information in which a nonlinear function such as an absolute value, a step function, a Sigmoid function, a soft sign, or a ramp function is further applied to information in which a linear filter is applied to the processing target image may be configured as a feature map.

The feature map may be a tensor of any number of ranks and any number of elements. Accordingly, for example, when the feature map is a tensor with rank-2, the number of elements may not be the same as the number of elements of the input processing target image. That is, the number of pixels of the feature map may be greater or less than the number of pixels of the processing target image.

Any number of feature maps may be generated.

Hereinafter, to facilitate the description, a case will be described in which a processing target image I is a tensor with rank-2 of n×n, m filters $f_i$ is convoluted for the processing target image I, and information in which a nonlinear function g is applied to each result is set as a feature map.

An i-th feature map $\phi_i$ is expressed as formula (1) below.

[Formula 1]

$$\phi(I)_i = g(f_i * I) \qquad (1)$$

A plurality of arbitrary filters may be further applied to the generated feature map hierarchically, and all or some application results of the filter to each layer may be a feature map. In each layer of the feature map obtained through hierarchical filtering processing (convolution processing), it is known that a feature related the details is reflected in a higher layer and a feature related to a context of an image is reflected in a lower layer.

The description will now return to FIG. 3.

Subsequently, the reference feature vector generation unit 104 generates the reference feature vector based on the reference feature map generated by the reference feature map generation unit 103. Then, the reference feature vector storage unit 105 stores the reference feature vector generated by the reference feature vector generation unit 104 (step S103).

In step S103, any method can be used as a method of generating the reference feature vector from the reference feature map.

The reference feature vector generated based on the reference feature map may be any tensor with rank-1 or higher rank rather than a vector. Hereinafter, to facilitate description, the generated reference feature vector which is a tensor $\Psi$ with rank-1 will be described.

As a simplest case, a tensor with rank-1 in which each element of the reference feature map is arranged can be used as the reference feature vector. For example, for each reference feature map, a statistical amount such as an average value, a variance value, a median value, a maximum value, a minimum value, skewness, or kurtosis of the tensor in the reference feature map can be used collectively as the reference feature vector.

For example, when an average value is used as a statistical amount, the reference feature vector has m elements and each element is expressed as in formula (2) below.

[Formula 2]
$$\psi(I)_i = \frac{1}{n \times n} \sum_{j=0}^{n-1} \sum_{k=0}^{n-1} \phi(I)_{i,j,k} \quad (2)$$

For example, a statistical amount of each element is obtained and a vector in which the obtained statistical amount is arranged in all the elements can be used as the reference feature vector.

For example, when the average value is used as the statistical amount, the reference feature vector has $n^2$ elements, and each element is expressed as in formula (3) below.

[Formula 3]
$$\psi(I)_{j \times n+k} = \frac{1}{m} \sum_{i=0}^{m-1} \phi(I)_{i,j,k} \quad (3)$$

Alternatively, a set of gram matrixes generated by the cross-correlation between the reference feature maps or a set of statistical amounts can be used as a reference feature vector. The gram matrix is known to reflect a global style feature of an image (see NPL 3).

For example, when an average value is used as a statistical amount, the reference feature vector has $m^2$ elements and each element is expressed as in formula (4) below.

[Formula 4]
$$\psi(I)_{i_1 \times m + i_2} = \frac{1}{n \times n} \sum_{j=0}^{n-1} \sum_{k=0}^{n-1} \phi(I)_{i_1,j,k} \phi(I)_{i_2,j,k} \quad (4)$$

Any other method may be used, such as a method of arranging elements of a feature map as reference feature vectors by random sampling or a method of adding and multiplying elements of the reference feature map based on a predetermined weighting coefficient. In this case, a sampling matrix or a weighting coefficient may be obtained in advance by learning or may be generated in accordance with a context.

As a method of generating the reference feature map and the reference feature vector, a feature extraction method used for general image identification or the like can be used. Any number of elements of the reference feature vectors may be used or a scalar value of the number of elements of 1 may be used.

The description will now return to FIG. 3.

Subsequently, the image updating unit 106 performs initialization to set an initial value of the updated image. Then, the image updating unit 106 generates an output image by repeating updating of the updated image in sequence (step S104).

For the initial value of the updated image mentioned here, a process of setting any image (an initial value) as a target image of the image updating processing by the image updating unit 106 is used. Hereinafter, to facilitate description, in the embodiment, a processing target image input to the image input unit 101 is set as an initial value. In addition, a random number in which any distribution function is used, an image encoded and decoded in accordance with any encoding method, or the like may be used as an initial value of the updated image.

Any updating method for the updated image performed in sequence can be used. Hereinafter, to facilitate description, in the embodiment, use of an updating method in accordance with an error back propagation method will be described.

Hereinafter, a process of repeating steps S105 to S110 will be described.

The image updating unit 106 updates each element of the updated image based on the updating amount and generates a new updated image (step S105). The updating amount is determined by the updating amount determination unit 111 to be described below, but an arbitrary initial value is used only the first time. Alternatively, the process of updating each element of the updated image based on the updating amount may be omitted only the first time.

Subsequently, the updating feature map generation unit 107 generates the updating feature map based on the updated image updated by the image updating unit 106 and at least one filter (step S106). The updating feature map generation unit 107 generates the updating feature map by performing processing similar to the processing performed by the reference feature map generation unit 103 described above. Here, in order to reduce a processing amount, for example, only a part of the processing may be performed.

The updating feature vector generation unit 108 generates the updating feature vector from the updating feature map generated by the updating feature map generation unit 107 (step S107). The updating feature vector generation unit 108 generates the updating feature vector by performing processing similar to the processing performed by the above-described reference feature vector generation unit 104. Here, in order to reduce a processing amount, for example, only a part of the processing may be performed.

Subsequently, the quality evaluation unit 109 evaluates the quality of the updated image based on the reference feature vector generated by the reference feature vector generation unit 104 and the updating feature vector generated by the updating feature vector generation unit 108, generates the quality feedback vector, and outputs the quality feedback vector (step S108).

As described above, any method can be used as an evaluation method of evaluating the quality of the updated image. Any configuration of the quality feedback vector can be used. For example, when the updating is performed in accordance with an error back propagation method, a partial differential vector of a loss function related to quality may be set as a quality feedback vector.

Any function can be used as the loss function. For example, when a mean squared error is used, a loss Eq in accordance with a feature vector $\Psi(I')$ of an updated image I' and a reference feature vector $\Psi(I)$ of a processing target image I can be defined as in formula (5) below.

[Formula 5]
$$E_q(I') = \frac{1}{n} \sum_{i=0}^{n-1} [\psi(I)_i - \psi(I')_i]^2 \quad (5)$$

A loss may be calculated by associating any weight with each element of feature vectors (a reference feature vector and an updating feature vector). For example, feature maps (a reference feature map and an updating feature map) are generated through hierarchical convolution processing. When each element of the feature vector corresponds to a feature map, a loss in which a more abstract context is weighted is obtained by giving a weight as follows. Giving the weight as follows is further weighting a weight to an element corresponding to a feature map generated in a lower layer than a weight to an element corresponding to a feature map generated in an upper layer.

Instead of the loss function in the comparison between the feature vectors, an identification method used for general image identification may be used to identify an image and the loss function in accordance with identification precision may be used. Target quality may be set and the loss function indicating a loss in an approach to a target may be defined for use.

A plurality of loss functions may be combined. A different feature vector may be generated and used for each loss function. In this case, as feature vectors to be additionally used, an input processing target image and an updated image may be used.

For example, a case in which a vector indicating an abstract context is used as a first feature vector $\Psi_1$ and a vector in which a pixel value of an image is arranged is used as a second feature vector $\Psi_2$ will be described. A loss function by the first feature vector is defined as a first loss function $E_{q1}(I')$ and a loss function of an updated image and a processing target image by the second feature vector is defined as a second loss function $E_{q2}(I')$ as in formulae (6) and (7) below.

[Formula 6]

$$E_{q1}(I') = \frac{1}{n}\sum_{i=0}^{n-1}[\psi_1(I)_i - \psi_1(I')_i]^2 \quad (6)$$

[Formula 7]

$$E_{q1}(I') = \frac{1}{n}\sum_{i=0}^{n-1}[[\psi_2(I)_i - \psi_2(I')_i]^2 - t]^2 \quad (7)$$

Here, t is a mean squared error (MSE) value indicating the target quality.

By setting a linear combination of the first loss function $E_{q1}(I')$ and the second loss function $E_{q2}(I')$ as a loss function, it is possible to improve abstract quality while matching the quality of a pixel unit to a target range or improve quality of a pixel unit while matching the abstract quality to the target range.

The description will now return to FIG. 3.

Subsequently, the encoding amount evaluation unit 110 evaluates an encoding amount of the updated image updated by the image updating unit 106, generates the encoding amount feedback vector, and outputs the encoding amount feedback vector (step S109).

As described above, any method can be used as an evaluation method of evaluating the encoding amount of the updated image. Any configuration of the encoding amount feedback vector can be used. For example, when the updating is performed in accordance with an error back propagation method, a partial differential vector of a loss function related to an encoding amount may be set as an encoding amount feedback vector.

Any function can be used as the loss function. For example, when an encoding model is assumed to be intra-encoding of H.264, for example, as in the technique described in NPL 4, the loss function can be defined by causing an average of absolute values of first derivation of an image to be proportional to an encoding amount. At this time, when a mean squared error is used, a loss $E_c$ of the updated image I' can be defined as in formula (8) below.

[Formula 8]

$$E_c(I) = \frac{1}{n}\sum_{i=0}^{n-1}|grad(I')|_i^2 \quad (8)$$

A target encoding amount may be set and a loss function indicating a loss in an approach to a target can be defined for use.

The description will now return to FIG. 3.

Subsequently, the updating amount determination unit 111 determines an updating amount based on the quality feedback vector generated by the quality evaluation unit 109 and the encoding amount feedback vector generated by the encoding amount evaluation unit 110 and outputs information indicating an updating amount to the image updating unit 106 (step S110).

Any method can be used as a method of determining an updating amount. For example, when the updating is performed in accordance with an error back propagation method, a partial differential vector of each loss is propagated back and a gradient of an updating target image is obtained to determine an updating amount.

The processing of steps S105 to S110 is repeatedly performed. Then, when the predetermined condition is satisfied, the image updating unit 106 ends the repetition processing (step S111) and outputs the updated image (step S112).

The predetermined condition mentioned here is that, for example, the repetition processing is performed a predetermined number of times or the updated image is evaluated in accordance with any evaluation method and an evaluation result is a predetermined evaluation result or the like.

As described above, the image processing device 100 according to the embodiment of the present invention generates a feature vector (a quality feedback vector) indicating an essential feature of an image and evaluates image quality. The image processing device 100 generates a feature vector (an encoding amount feedback vector) that has correlation with an encoding amount of the image and evaluates the image encoding amount. Then, the image processing device 100 performs image updating to optimize the image quality and the image encoding amount. Thus, the image processing device 100 evaluates the image quality using a feature vector rather than performing comparison evaluation of a pixel unit in the quality evaluation. The image processing device 100 updates the pixel value rather than performing the filtering processing. Thus, the image processing device 100 can generate an image in which prediction and encoding are possible with good performance using various prediction and encoding tools while keeping the details or context of the image.

In the foregoing configuration, the image processing device 100 according to the embodiment of the present invention can adjust the quality and the encoding amount while reducing a calculation cost.

A part or all of the image processing device 100 according to the above-described embodiment may be realized by a computer. In this case, a program realizing the function may be recorded on a computer-readable recording medium and the program recorded on the recording medium may be read and executed in a computer system to realize the function. The "computer system" mentioned here is assumed to include an OS or hardware such as peripheral devices. The "computer-readable recording medium" is a portable medium such as a flexible disk, a magneto-optical disc, a ROM, or a CD-ROM or a storage device such as a hard disk contained in a computer system. The "computer-readable recording medium" may include a line for dynamically maintaining a program for a short time, such as a communication line when a program is transmitted via a communication line such as a telephone line or a network such as the Internet and a memory maintaining a program for a given time, such as a volatile memory inside a computer system serving as a server or a client in this case. The program may be a program that realizes some of the above-described functions, a program combined with a program in which the above-described functions have already been recorded on a computer system to realize the above-described function, or a program realized using hardware such as a programmable logic device (PLD) or a field programmable gate array (FPGA).

Embodiments of the present invention have been described above with reference to the drawings, but the embodiments are merely examples of the present invention and it is apparent that the present invention is not limited to the foregoing embodiments. Accordingly, additions, omissions, substitutions, and other changes of the constituent elements can be made within the scope of the present invention without departing from the technical ideas and the gist of the present invention.

REFERENCE SIGNS LIST

100 Image processing device
101 Image input unit
102 Image storage unit
103 Reference feature map generation unit
104 Reference feature vector generation unit
105 Reference feature vector storage unit
106 Image updating unit
107 Updating feature map generation unit
108 Updating feature vector generation unit
109 Quality evaluation unit
110 Encoding amount evaluation unit
111 Updating amount determination unit

The invention claimed is:

1. An image processing device that updates a pixel value of a processing target image and generates a new image, the image processing device comprising:
a processor; and
a storage medium having computer program instructions stored thereon, when executed by the processor, perform to:
a) generate a first feature map based on the processed target image and at least one pre-decided filter;
b) generate a first feature vector based on the processing target image and the first feature map;
c) update pixels of the processing target image using an updating amount to generate an updated image;
d) generate an updating feature map based on the updated image and at least one pre-decided filter;
e) generate a second feature vector based on the updated image and the updating feature map;
f) perform quality evaluation of the updated image based on the first and second feature vectors and generate a quality feedback vector which is a vector based on a result of the quality evaluation;
g) perform an encoding amount evaluation on the updated image and generate an encoding amount feedback vector which is a vector based on a result of the encoding amount evaluation;
h) determine an updating amount in updating of the updated image based on the quality feedback vector and the encoding amount feedback vector; and
i) repeating steps c)-h) until a predetermined condition is met.

2. The image processing device according to claim 1, wherein at least one of the first and updating feature maps is generated through hierarchical convolution processing by the plurality of filters.

3. The image processing device according to claim 1, wherein at least one of the first and second feature vectors is generated based on a statistical amount of the first or updating feature map.

4. The image processing device according to claim 1, wherein at least one of the first and second feature vectors is generated based on a cross-correlation between the first feature maps or a cross-correlation between the updating feature maps.

5. An image processing method performed by an image processing device that updates a pixel value of a processing target image and generates a new image, the method comprising:
a) generate a first feature vector based on the processed target image and at least one pre-decided filter;
b) generating a first feature vector based on the processing target image and the first feature map;
c) updating pixels of the processing target image using an updating amount to generate an updated image;
d) generating an updating feature map based on the updated image and at least one pre-decided filter;
e) generating a second feature vector based on the updated image and the updating feature map;
f) performing quality evaluation of the updated image based on the first and second feature vectors and generating a quality feedback vector which is a vector based on a result of the quality evaluation;
g) performing an encoding amount evaluation on the updated image and generating an encoding amount feedback vector which is a vector based on a result of the encoding amount evaluation;
h) determining an updating amount in updating of the updated image based on the quality feedback vector and the encoding amount feedback vector; and
i) repeating steps c)-h) until a predetermined condition is met.

6. An image processing program causing a computer to function as the image processing device according to claim 1.

7. The image processing device according to claim 1 further comprises updating pixels of the processing target image using error back propagation method.

8. The image processing device according to claim 1 wherein the quality feedback vector is further defined as a partial differential vector of a loss function related to quality.

9. The image processing device according to claim 1 wherein the encoding amount feedback vector is further defined as a partial differential vector of a loss function related to encoding amount.

* * * * *